F. A. NELSON & H. E. GILHAM.
CONTROLLING VALVE FOR FLUID PRESSURE OPERATED FENDERS.
APPLICATION FILED JUNE 28, 1911.

1,068,919.

Patented July 29, 1913.

3 SHEETS—SHEET 1.

WITNESSES:

INVENTORS
FRANK A. NELSON.
HARRY E. GILHAM.
BY
ATTORNEYS.

F. A. NELSON & H. E. GILHAM.
CONTROLLING VALVE FOR FLUID PRESSURE OPERATED FENDERS.
APPLICATION FILED JUNE 28, 1911.

1,068,919.

Patented July 29, 1913.

3 SHEETS—SHEET 2.

WITNESSES:

INVENTORS
FRANK A. NELSON.
HARRY E. GILHAM.
BY
ATTORNEYS.

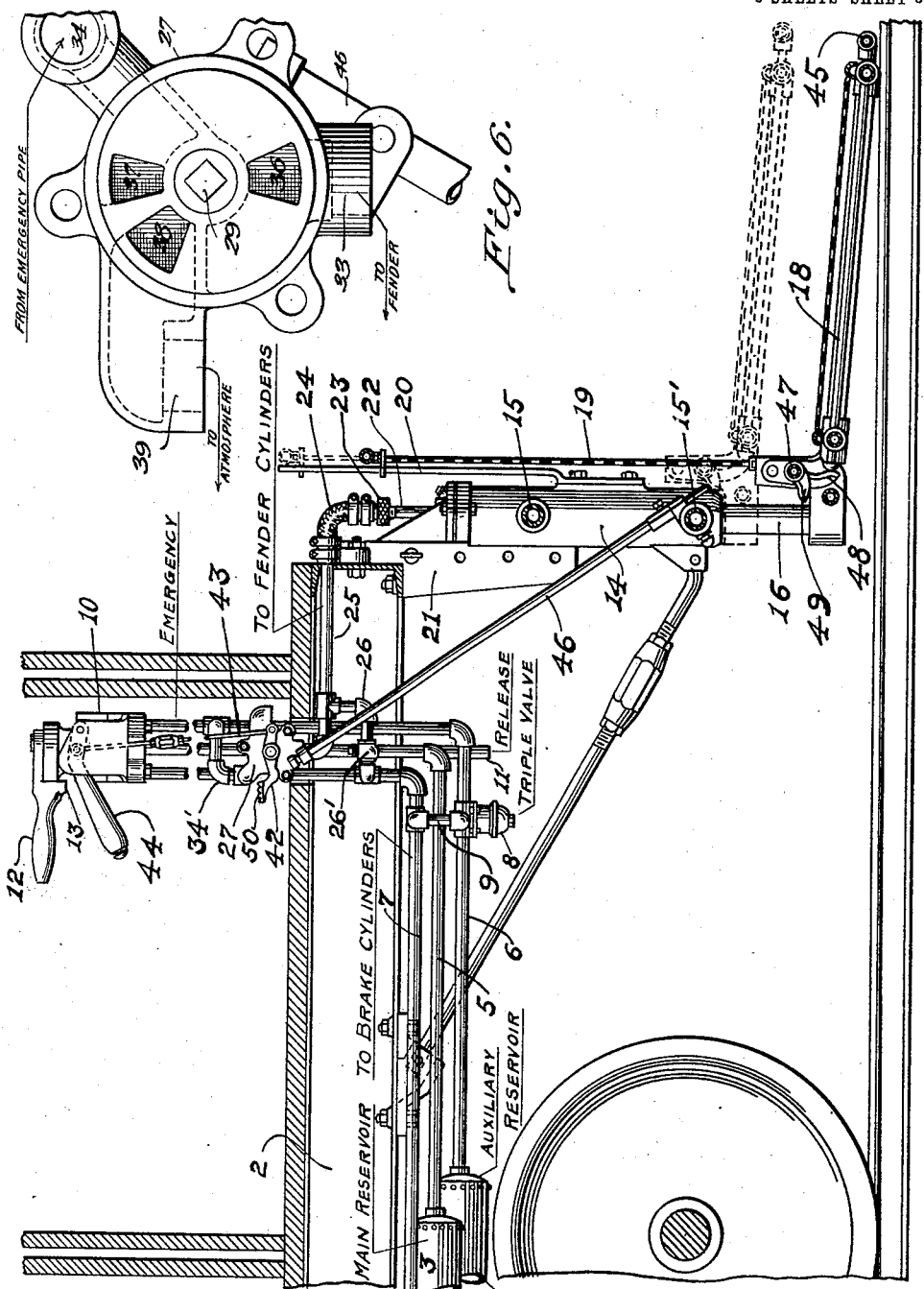

UNITED STATES PATENT OFFICE.

FRANK A. NELSON, OF MINNEAPOLIS, MINNESOTA, AND HARRY E. GILHAM, OF SEATTLE, WASHINGTON, ASSIGNORS TO FRED H. LYSONS, TRUSTEE, OF SEATTLE, WASHINGTON.

CONTROLLING-VALVE FOR FLUID-PRESSURE-OPERATED FENDERS.

1,068,919.  Specification of Letters Patent.  Patented July 29, 1913.

Application filed June 28, 1911. Serial No. 635,886.

*To all whom it may concern:*

Be it known that we, FRANK A. NELSON, of Minneapolis, Hennepin county, Minnesota, and HARRY E. GILHAM, of Seattle, King county, Washington, have invented certain new and useful Improvements in Controlling-Valves for Fluid-Pressure-Operated Fenders, of which the following is a specification.

The object of our invention is to provide a fluid pressure operated mechanism for controlling the movement of a fender such as may be attached to a street car, and the particular object of the invention is to provide a valve for use with a fluid pressure system by means of which the admission of fluid pressure to the brake and fender cylinders can be controlled.

Other objects of the invention will appear from the following detailed description.

The invention consists generally in various constructions and combinations, all as hereinafter described and particularly pointed out in the claims.

Figure 1:
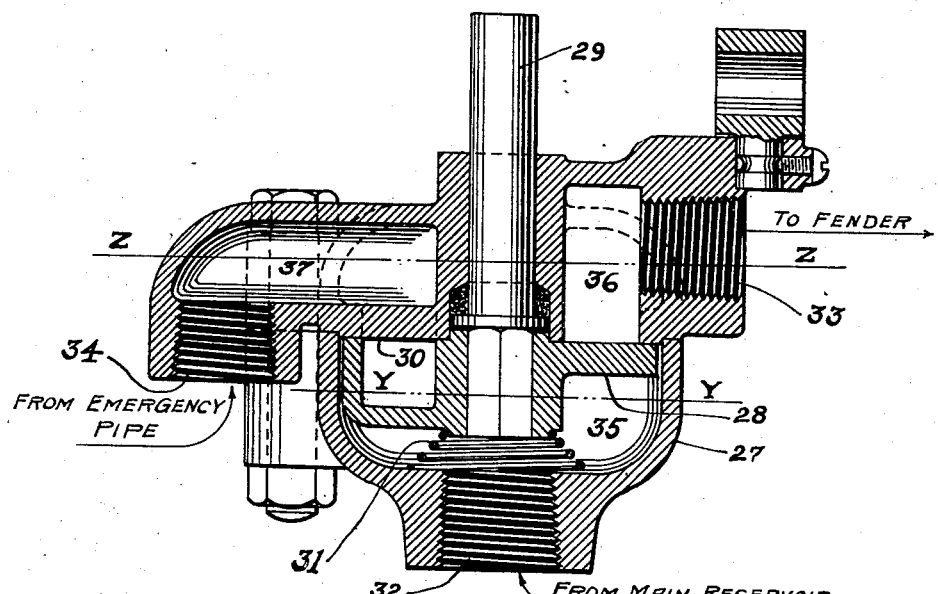
Figure 2:
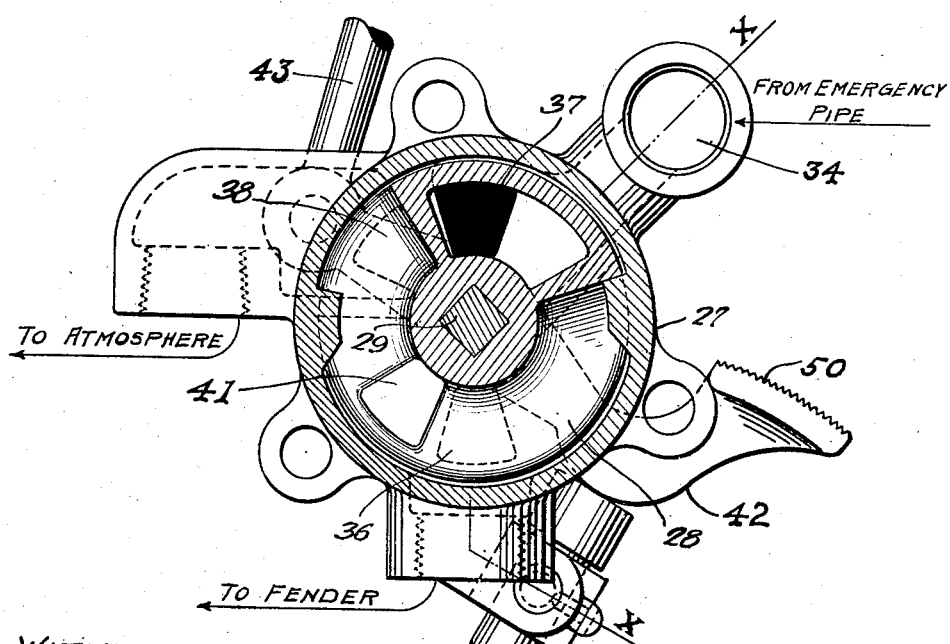
Figure 3:
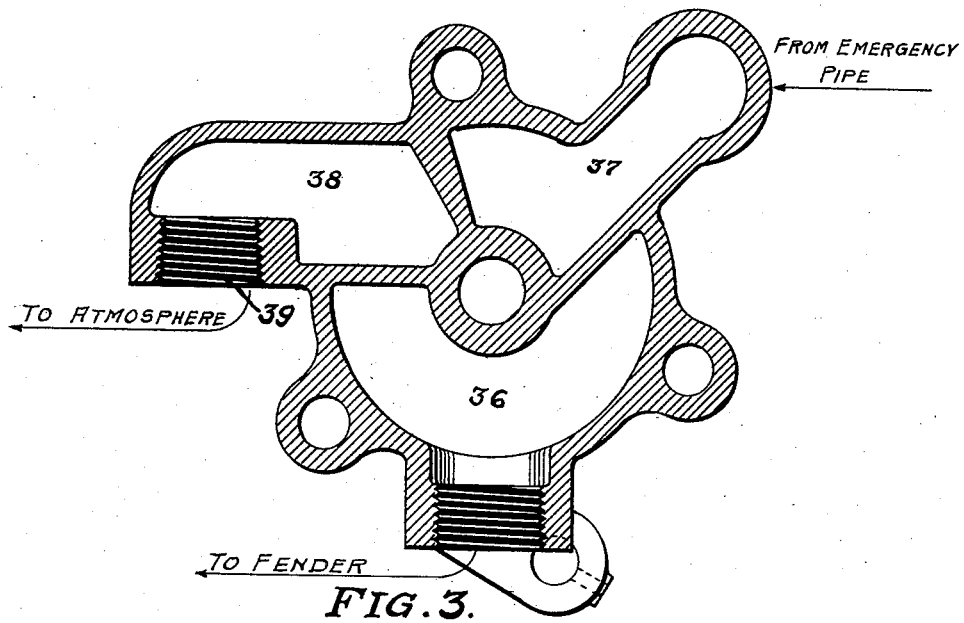
Figure 4:
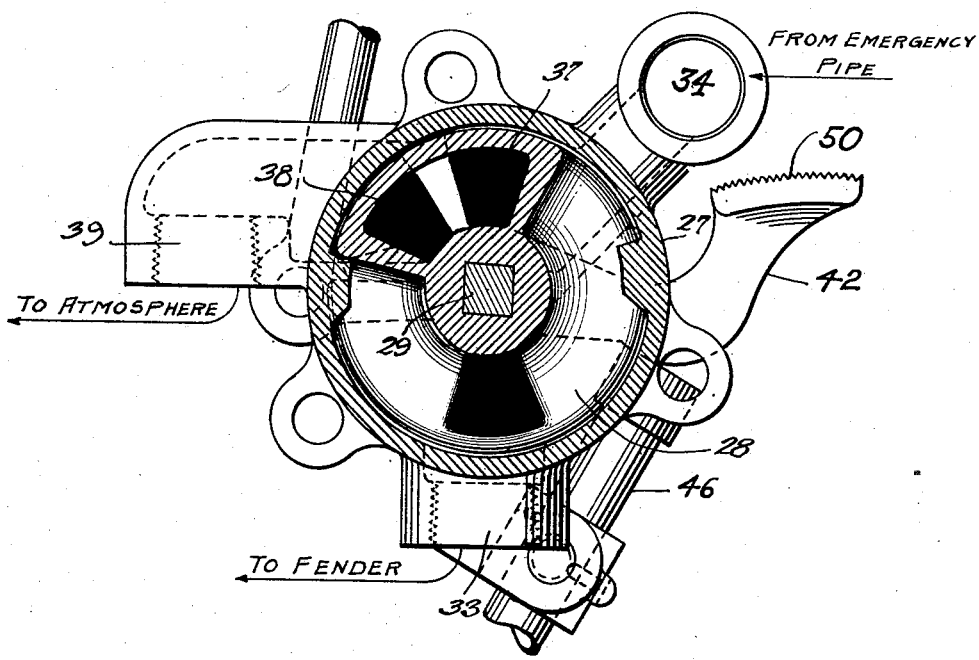

In the accompanying drawings forming part of this specification, Figure 1 is a sectional view on the line X—X of Fig. 2, showing the construction of the valve, Fig. 2 is a rear elevation of the valve, as shown in Fig. 5, with a portion of the casing removed. Fig. 3 is a sectional view on the line Z—Z of Fig. 1. Fig. 4 is a sectional view on the line Y—Y of Fig. 1. Fig. 5 is a side elevation showing the fender in full lines in its operative position and in dotted lines in its raised or inoperative position. Fig. 6 is a detail view showing the ports in the valve seat.

In the drawing, 2 represents the car truck, 3 the main fluid pressure reservoir, 4 the auxiliary reservoir, 5 the pipe from the main reservoir and 7 a pipe to the brake cylinders, not shown.

8 is a triple or three-way valve of ordinary type, such as is generally used in brake systems, interposed in the pipe 6 from the auxiliary reservoir and having a branch pipe 9 leading to the brake cylinder pipe 7. These pipes all lead to the main controlling valve 10, which is provided with a release or exhaust pipe 11. An operating lever 12 is provided for the valve 10. This lever is of ordinary construction, except that it is provided with a depending lug 13, for the purpose hereinafter described and is capable of removal from the valve to the opposite end of the car where a similar controlling valve is mounted in substantially the same manner as shown.

14 represents the fender cylinder, there being preferably two in number on opposite sides of the longitudinal center of the car, connected by transverse bracing means 15 and 15'.

16 represents the plunger of the cylinder supporting the fender 18, that is capable of vertical movement with the plunger. 19 is a life guard carried by the fender and vertically slidable on a guide 20. The cylinder 14 is supported by a hanger 21 secured to the front of the car frame. The pipe 22 communicates with the cylinders and has a coupling 23 for attaching it to a flexible hose 24 which communicates with a pipe 25. This pipe 25 has a pipe connection 26 through a check valve 26' with the brake cylinder pipe and also communicates with the valve casing 27 having therein a valve disk 28 by means of which the admission of fluid pressure to the cylinders is controlled.

Referring now to Figs. 1 to 4, we have shown the valve casing and disk, the latter mounted on a stem 29 and yieldingly held against its seat 30 in the valve casing 27 by means of a spring 31. The valve casing 27 is provided with ports 32, 33, and 34, into which the pipe 5 from the main reservoir, the pipe 25 leading to the fender cylinders, and the pipe 34' from the emergency pipe or the pipe 6, are tapered in the usual way. These ports communicate respectively with chambers 35, 36 and 37 within the valve casing and a chamber 38 is also provided within said casing communicating with a port 39 into which the release or exhaust pipe 11 is tapped. The valve disk 28 has a port 41 therein, (see Fig. 2), which is adapted to form a communicating passage between the chambers 35 and 36 in the valve casing as the valve disk is revolved by the rotation of the stem 29. The ports in the valve are so arranged with respect to one another and the valve chambers that when one of the ports registers with the chamber communicating with the main reservoir port a communicating passage will be established with the chamber 36 leading to the fender port and so that the fluid pressure will pass through the valve from the main reservoir directly to the fender cylinders. The valve stem 29 has a lever 42 mounted thereon connected at one end by an operating rod 43 with a lever 44 that is mounted on the controlling valve 10 in position to be actuated by the lever 12 when it is thrown to the emergency position. The depression of the lever 44 will rock the lever 42 and rotate the valve, admitting fluid pressure to the brake cylinders. At the same time the fluid pressure between the triple valve 8 and the controlling valve 10 will be allowed to escape, causing the operation of the triple valve in the well-known way to direct the fluid pressure through the branch pipe 9 to the brake cylinder pipe. The fender will thereby be lowered and the brakes set simultaneously.

In case the fender is in its dotted line position, as shown in Fig. 5, and an object on the track is struck by the projecting rail 45, the rod 46 will be actuated through the rock shaft 47, the lever 48 and the arm 49 to engage the lever 42 and operate it automatically to admit fluid pressure to the fender cylinders and to the brake cylinders. Fluid pressure may also be admitted to the brake cylinders from the main reservoir through the pipe 5 and the brake cylinder pipe and the controlling valve 10, the check valve 26' opening toward the left and preventing the fluid pressure from flowing to the fender cylinders, thus allowing the brakes to be set without operating the fender, if desired.

All this mechanism corresponds substantially to that shown and described in our pending application for Letters Patent of the United States, executed June 14, 1911, and we make no claim broadly to the same herein except in combination with this peculiar type of valve.

The auxiliary controlling valve may be returned to its normal position by the driver placing his foot on the treadle 50 provided on one end of the lever 42.

The valve herein shown and described has substantially the same functions as the valve shown in our pending application referred to, but is of a type that we prefer to use rather than the one shown in said application.

We claim as our invention:

1. The combination with a truck frame, of a fluid pressure brake operating mechanism mounted therein and including a fluid pressure reservoir, a controlling valve and an operating lever therefor, fluid pressure supply and exhaust pipes, an auxiliary valve connected with the said brake controlling mechanism and comprising a casing having ports for connection with the main reservoir, said casing also having chambers formed therein communicating with said ports respectively, a rotating disk having ports therein arranged to form communicating passages between said chambers, fender cylinders mounted on said frame and pistons therein, fenders carried by said pistons and means arranged to be actuated by the movement of said operating lever to rotate said auxiliary valve and admit fluid pressure to said fender cylinders and said brake operating mechanism simultaneously.

2. The combination, with a truck frame, of a fluid pressure cylinder mounted therein, a brake reservoir pipe, a valve having reservoir and fender ports, fender cylinders carried by said frame, pistons for said cylinders, a fender mounted on said pistons, a pipe connecting said fender cylinders with the fender port of said valve, a pipe connecting the reservoir port of said valve with said fluid pressure reservoir, a branch pipe leading from said fender cylinder pipe to said brake cylinder pipe, a check valve in said branch pipe, said valve having ports forming communicating passages between the ports of said casing and admitting fluid pressure to said fender cylinder pipe and said brake cylinder pipe simultaneously.

3. The combination, with a truck frame, of a fluid pressure reservoir mounted therein, a fluid pressure controlling valve having a pipe connection with said fluid pressure reservoir and provided with an exhaust, a brake cylinder pipe also communicating with said valve, an operating lever for said valve, an auxiliary valve communicating with said fluid pressure pipe and comprising a casing having reservoir and fender cylinder ports therein, and chambers within said casing communicating with said ports, a rotary disk having ports therein, forming communicating passages between said chambers, fender cylinders supported on said truck frame and having pipe connections with said fender port, a fender carried by said pistons, a branch pipe leading from said cylinder pipe to said brake cylinder pipe, and means actuated by the movement of said controlling valve lever for operating said auxiliary valve and admitting fluid pressure to said fender cylinders and to said brake cylinder pipe simultaneously.

4. The combination with a truck frame, of a fluid pressure reservoir mounted therein, a brake cylinder pipe, a valve comprising a casing having main reservoir and fender ports therein, fender cylinders carried by said frame, pistons for said cylinders, a fender mounted on said pistons, a pipe connecting said fender cylinders with the fender port of said valve and a pipe connecting the reservoir port of said valve with said fluid pressure reservoir, a branch pipe leading from said fender cylinders pipe to said brake cylinder pipe, a disk mounted in said casing and having ports therein, said ports forming communicating passages between the ports of said casing and admitting fluid pressure to said fender cylinders pipe and said brake cylinder pipe simultaneously, and means projecting in front of said fender to contact with an object on the track, and operative connections between said means and said valve whereby said valve will be rotated, said fender lowered and the brakes set simultaneously.

5. The combination, with a truck frame, of a main fluid pressure reservoir and an auxiliary reservoir mounted thereon, a brake cylinder pipe, a controlling valve having an operating lever, a triple valve communicating with said auxiliary reservoir and having a branch pipe connection with said brake cylinder pipe, fender cylinders and pistons therefor, a fender carried by said pistons, an auxiliary valve having pipe connections with said fender cylinders and with said auxiliary reservoir, and means actuated by the movement of said controlling valve lever for admitting fluid pressure to said fender cylinders and opening the passage through said triple valve between said auxiliary reservoir and said brake cylinder pipe simultaneously.

In witness whereof, we have hereunto set our hands this 14th day of June, 1911.

FRANK A. NELSON.
HARRY E. GILHAM.

Witnesses:
GENEVIEVE E. SORENSEN,
EDWARD A. PAUL.

Copies of this patent may be obtained for five cents each, by addressing the "Commissioner of Patents, Washington, D. C."